(12) United States Patent
Shimizu et al.

(10) Patent No.: US 7,873,247 B2
(45) Date of Patent: Jan. 18, 2011

(54) OPTICAL WAVEGUIDE FOR TOUCH PANEL

(75) Inventors: Yusuke Shimizu, Osaka (JP); Noriyuki Juni, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 445 days.

(21) Appl. No.: 12/033,064

(22) Filed: Feb. 19, 2008

(65) Prior Publication Data

US 2008/0198144 A1    Aug. 21, 2008

Related U.S. Application Data

(60) Provisional application No. 60/949,679, filed on Jul. 13, 2007.

(30) Foreign Application Priority Data

Feb. 19, 2007    (JP) .............................. 2007-038092

(51) Int. Cl.
*G02B 6/32* (2006.01)
*G02B 6/10* (2006.01)
*G06F 3/042* (2006.01)

(52) U.S. Cl. ........................ 385/33; 385/14; 385/131; 345/175; 345/176

(58) Field of Classification Search .................. 385/14, 385/33, 50, 129–132; 345/173, 175, 176
See application file for complete search history.

(56) References Cited

U.S. PATENT DOCUMENTS 5,179,369 A    1/1993    Person

| 6,992,659 | B2 | 1/2006 | Gettemy | |
|---|---|---|---|---|
| 7,676,131 | B2 * | 3/2010 | Luo | ........................... 385/129 |
| 7,805,036 | B2 * | 9/2010 | Juni | ........................... 385/33 |
| 2002/0175901 | A1 | 11/2002 | Gettemy | |
| 2004/0201579 | A1 | 10/2004 | Graham | |

(Continued)

FOREIGN PATENT DOCUMENTS

GB    2238866 A    6/1991

(Continued)

OTHER PUBLICATIONS

European Search Report dated Oct. 7, 2009, issued in corresponding European Patent Application No. 08002372.

*Primary Examiner*—Daniel Petkovsek
(74) *Attorney, Agent, or Firm*—Westerman, Hattori, Daniels & Adrian, LLP

(57) ABSTRACT

An optical waveguide for a touch panel which includes a planar base; light emitting cores and light incident cores provided on a surface of the base; and an over-cladding layer covering the cores. The light emitting core has a first lens portion provided at the end thereof for suppressing lateral divergence of the emitted light beam, the over-cladding layer has a second lens portion provided in an edge portion thereof covering the end of the light emitting core for suppressing vertical divergence of the emitted light beam, the over-cladding layer has a third lens portion provided in an edge portion thereof covering the end of the light incident core for vertically converging the incident light beam, and the light incident core has a fourth lens portion provided at the end thereof for further laterally converging the incident light beam.

3 Claims, 10 Drawing Sheets

U.S. PATENT DOCUMENTS

| | | |
|---|---|---|
| 2005/0271326 A1 | 12/2005 | Luo |
| 2006/0088244 A1 | 4/2006 | Kukulj et al. |
| 2008/0159694 A1 * | 7/2008 | Payne .......................... 385/33 |

FOREIGN PATENT DOCUMENTS

| | | |
|---|---|---|
| JP | 2003-004960 A | 1/2003 |
| WO | 02-095668 A1 | 11/2002 |

* cited by examiner

OPTICAL WAVEGUIDE FOR TOUCH PANEL

RELATED APPLICATIONS

This application claims the benefit of U.S. Provisional Application No. 60/949,679, filed on Jul. 13, 2007, which is hereby incorporated by reference.

BACKGROUND OF THE INVENTION

1. Field of the Invention

The present invention relates to an optical waveguide for a touch panel.

2. Description of the Related Art

Touch panels are input devices for operating an apparatus by directly touching a display screen of a liquid crystal display device or the like by a finger, a special stylus or the like, and include a display which displays operation items, and detection means which detects the position (coordinates) of a portion of the display screen of the display touched by the finger or the like. Information of the touch position detected by the detection means is sent in the form of a signal to the apparatus, which in turn performs an operation specified by the touch position. Examples of the apparatus employing such a touch panel include ATMs in banking facilities, ticket venders in stations and portable game machines.

A detection device employing a light transmission device is proposed as the detection means for detecting the finger touch position on the touch panel (see, for example, U.S. 2004/0201579A1: Patent Document 1). That is, the light transmission device includes an optical waveguide which is disposed along a periphery of a display screen of a rectangular display and is configured such that a multiplicity of light beams are emitted parallel to the display screen of the display from an optical waveguide portion disposed on one side of the display screen of the display and incident on an optical waveguide portion disposed on the other side. The light transmission device causes the light beams to travel in a lattice form on the display screen of the display. When a portion of the display screen of the display is touched by a finger in this state, the finger blocks some of the light beams. Therefore, the position of the portion touched by the finger is detected by detecting a light blocked portion by the optical waveguide portion on the light incident side.

On the other hand, a light transmission device having a higher light transmission efficiency is also proposed (see, for example, JP-A1-2003-4960: Patent Document 2). In an ordinary optical waveguide, light emitting faces (end faces of cores) are flat, so that light beams emitted from the optical waveguide are radially diverged in air. Therefore, the light transmission efficiency is reduced. In the light transmission device of Patent Document 2, on the contrary, a light emitting optical waveguide has a first lens provided at an end thereof as having the same three-layer structure as the optical waveguide including an under-cladding layer, a core layer and an over-cladding layer. The first lens prevents lateral divergence of a light beam. Further, a second lens is disposed in front of the first lens (downstream of the first lens in a light traveling direction) apart from the first lens. The second lens prevents vertical divergence of the light beam. Thus, the light beam having passed through the second lens is collimated. Further, a light incident optical waveguide also has first and second lenses, so that the collimated light beam is vertically converged by the second lens and laterally converged by the first lens. Thus, the converged light beam is incident on the light incident optical waveguide. This increases the light transmission efficiency.

In the light transmission device of Patent Document 2, however, the first lenses and the second lenses are provided as separate members. Therefore, unless the lenses are accurately positioned, it is impossible to sufficiently increase the light transmission efficiency. In addition, the positioning of the lenses is time-consuming.

SUMMARY OF THE INVENTION

In view of the foregoing, it is an object of the present invention to provide an optical waveguide for a touch panel which obviates the need for positioning the lenses.

According to a first aspect of the present invention to achieve the aforementioned object, there is provided a touch panel optical waveguide, which is to be disposed along a periphery of a display screen of a display of a touch panel, and comprises a planar base, cores provided on a surface of the base, and an over-cladding layer covering the cores, the cores including a light emitting core having an end positioned on one side of the display screen of the display for emitting a light beam, and a light incident core having an end positioned on the other side of the display screen of the display for receiving a light beam incident thereon, wherein the light emitting core has a first lens portion provided at the end thereof for suppressing lateral divergence of the emitted light beam, wherein the over-cladding layer has a second lens portion provided in an edge portion thereof covering the end of the light emitting core for suppressing vertical divergence of the emitted light beam, wherein the over-cladding layer has a third lens portion provided in an edge portion thereof covering the end of the light incident core for vertically converging the incident light beam, wherein the light incident core has a fourth lens portion provided at the end thereof for further laterally converging the incident light beam.

According to a second aspect of the present invention, there is provided a band-shaped touch panel optical waveguide, which is to be disposed along a periphery of a display of a touch panel, and comprises a light-transmissive under-cladding layer, cores provided on a surface of the under-cladding layer, and an over-cladding layer covering the cores, the cores including a light emitting core having an end positioned on one side of the display for emitting a light beam, and a light incident core having an end positioned on the other side of the display for receiving a light beam incident thereon, wherein the light emitting core has a first lens portion provided at the end thereof for suppressing lateral divergence of the emitted light beam, wherein a first reflective layer which suppresses vertical divergence of the emitted light beam is provided on a surface of an edge portion of the over-cladding layer covering the end of the light emitting core, wherein a second reflective layer which vertically converges the incident light beam is provided on a surface of an edge portion of the over-cladding layer covering the end of the light incident core, wherein the light incident core has a fourth lens portion provided at the end thereof for further laterally converging the incident light beam.

In the touch panel optical waveguide according to the first inventive aspect, the light emitting core has the first lens portion provided at the end thereof for suppressing the lateral divergence of the emitted light beam, and the over-cladding layer has the second lens portion provided in the edge portion thereof covering the first lens portion for suppressing the vertical divergence of the emitted light beam. That is, the first lens portion is a part of the light emitting core, and the second lens portion is a part of the over-cladding layer. The core and the over-cladding layer are integrated with each other. Therefore, the touch panel optical waveguide according to the first inventive aspect is produced with the first lens portion and the second lens portion being properly positioned with respect to each other. This eliminates the need for thereafter positioning the first lens portion and the second lens portion with respect to each other. On the light incident side, similarly, the light incident core has the fourth lens portion provided at the end thereof for laterally converging the incident light beam, and the over-cladding layer has the third lens portion provided in the edge portion thereof covering the fourth lens portion for vertically converging the incident light beam. This eliminates the need for positioning the third lens portion and the fourth lens portion with respect to each other.

In the touch panel optical waveguide according to the second inventive aspect, the light emitting core has the first lens portion provided at the end thereof for suppressing the lateral divergence of the emitted light beam, and the first reflective layer which suppresses the vertical divergence of the emitted light beam is provided on the surface of the edge portion of the over-cladding layer covering the first lens portion. That is, the first lens portion is a part of the light emitting core, and the first reflective layer is provided on the surface of the over-cladding layer. The core and the over-cladding layer are integrated with each other. Therefore, the touch panel optical waveguide according to the second inventive aspect is produced with the first lens portion and the first reflective layer being properly positioned with respect to each other. This eliminates the need for thereafter positioning the first lens portion and the first reflective layer with respect to each other. On the light incident side, similarly, the light incident core has the fourth lens portion provided at the end thereof for laterally converging the incident light beam, and the second reflective layer which vertically converges the incident light beam is provided on the surface of the edge portion of the over-cladding layer covering the fourth lens portion. This eliminates the need for positioning the second reflective layer and the fourth lens portion with respect to each other.

DESCRIPTION OF THE PREFERRED EMBODIMENTS

Figure 1:
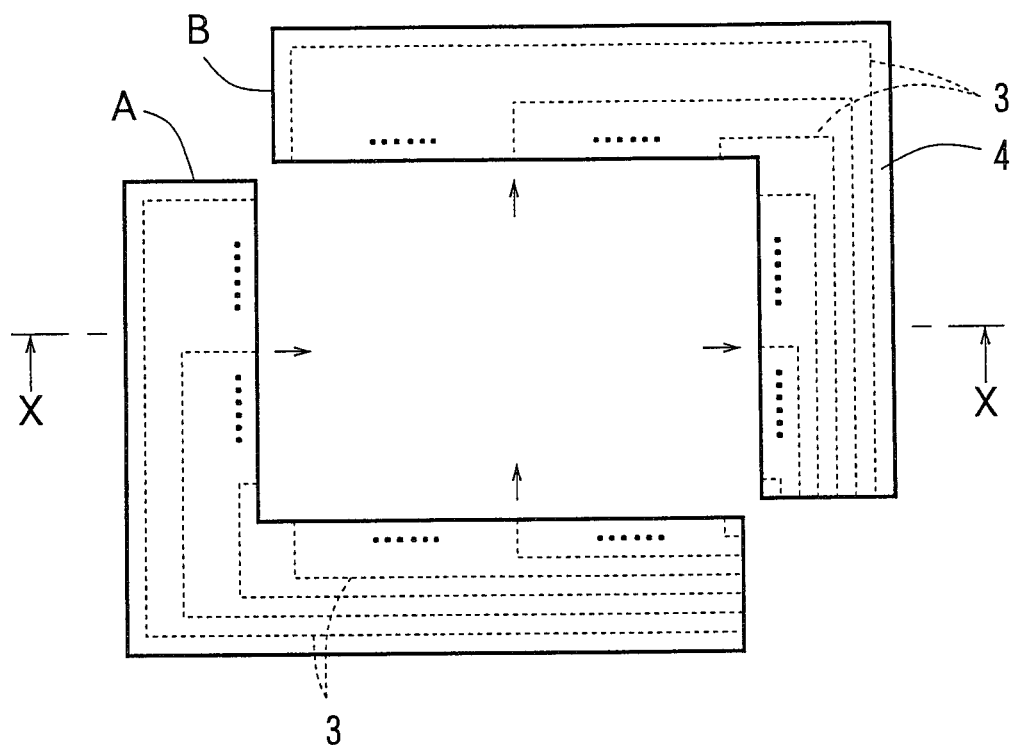
FIGS. 1(a) and 1(b) are a plan view and an X-X sectional view schematically illustrating a touch panel optical waveguide according to one embodiment of the first inventive aspect.
Figure 1:
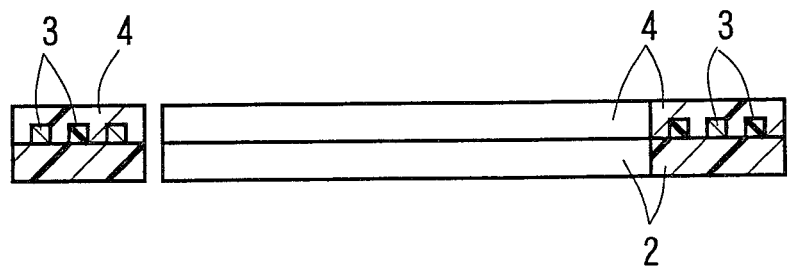

Embodiments of the present invention will hereinafter be described in detail with reference to the drawings.

FIGS. 1(a) and 1(b) illustrate an optical waveguide for a touch panel according to one embodiment of the first inventive aspect. The touch panel optical waveguide according to this embodiment includes two L-shaped optical waveguide portions A, B. One of the L-shaped optical waveguide portions A serves as a light emitting portion which emits light beams (as indicated by arrows in FIG. 1(a)), and the other L-shaped optical waveguide portion B serves as a light incident portion on which the light beams are incident. These two L-shaped optical waveguide portions A, B each have an L-shaped planar shape, and each include a plurality of cores 3 enclosed by an under-cladding layer (planar base) 2 and an over-cladding layer 4. As shown in FIG. 2, the optical waveguide is disposed along a periphery of a display screen of a rectangular display 11 of the touch panel 10 as surrounding the display screen. In this state, ends of the light emitting cores 3 are positioned on one side of the display screen of the display 11, and ends of the light incident cores 3 are positioned on the other side of the display screen of the display 11. In FIGS. 1(a) and 2, the cores 3 are indicated by broken lines, and the thicknesses of the broken lines represent the thicknesses of the cores 3. In FIGS. 1(a), 1(b) and 2, some of the cores 3 are not shown. This is true for the subsequent drawings.

In the L-shaped light emitting optical waveguide portion A, as shown in FIGS. 3(a) and 3(b), the light emitting cores 3 each have a lens portion (first lens portion 31) at the end thereof for suppressing lateral divergence of the emitted light beams L (along the under-cladding layer 2). The over-cladding layer 4 has a lens portion (second lens portion 41) provided in an edge portion thereof covering the first lens portions 31 of the light emitting cores 3 for suppressing vertical divergence of the emitted light beams (along a plane perpendicular to the under-cladding layer 2). In the L-shaped light incident optical waveguide portion B, similarly, the over-cladding layer 4 has a lens portion (third lens portion 42) provided in an edge portion thereof covering the ends of the light incident cores 3 for vertically converging the incident light beams L (along a plane perpendicular to the under-cladding layer 2), and the light incident cores 3 each have a lens portion (fourth lens portion 32) provided at the end thereof for laterally converging the incident light beams L (along the under-cladding layer 2).

Figure 2:
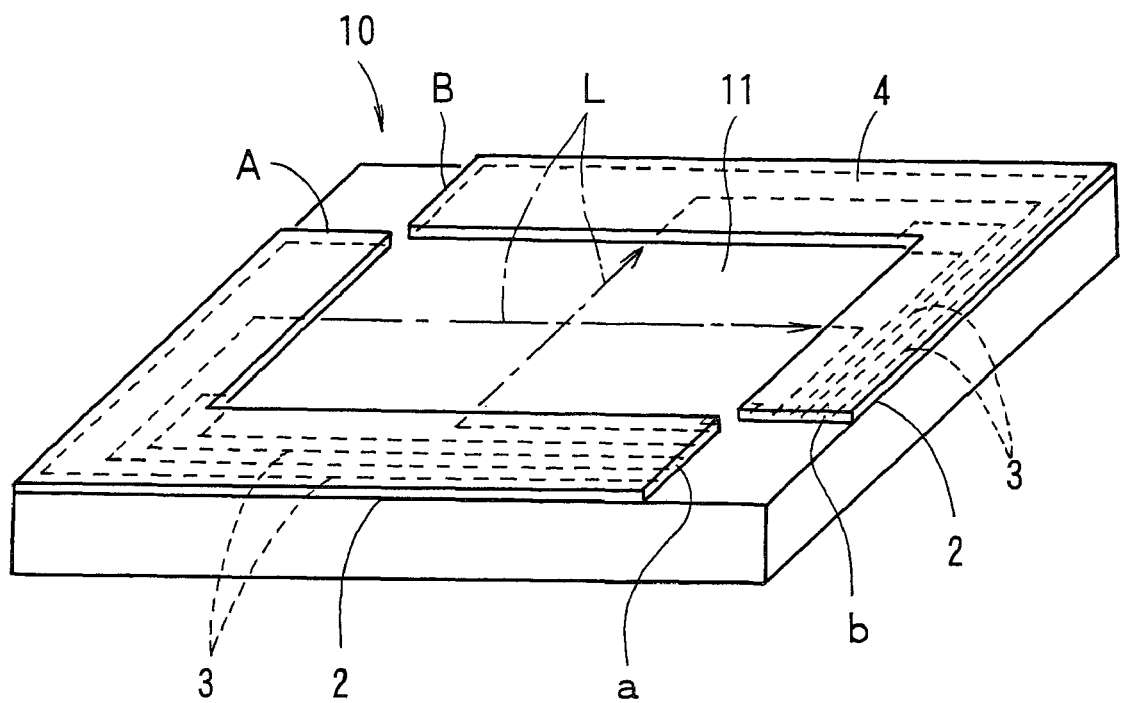
FIG. 2 is a perspective view schematically illustrating a touch panel employing the touch panel optical waveguide.
Figure 3:
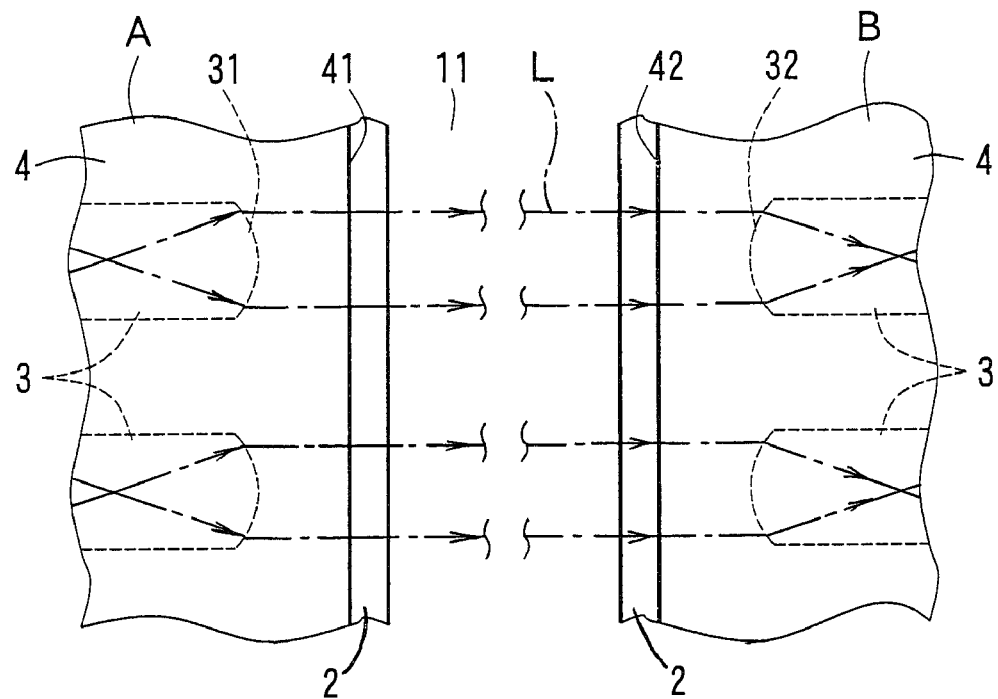
FIG. 3(a) is an explanatory diagram as seen perpendicularly to an under-cladding layer.
FIG. 3(b) is an explanatory diagram as seen parallel to the under-cladding layer and perpendicularly to a light transmission direction, each schematically showing light transmission in the touch panel optical waveguide.
Figure 3:
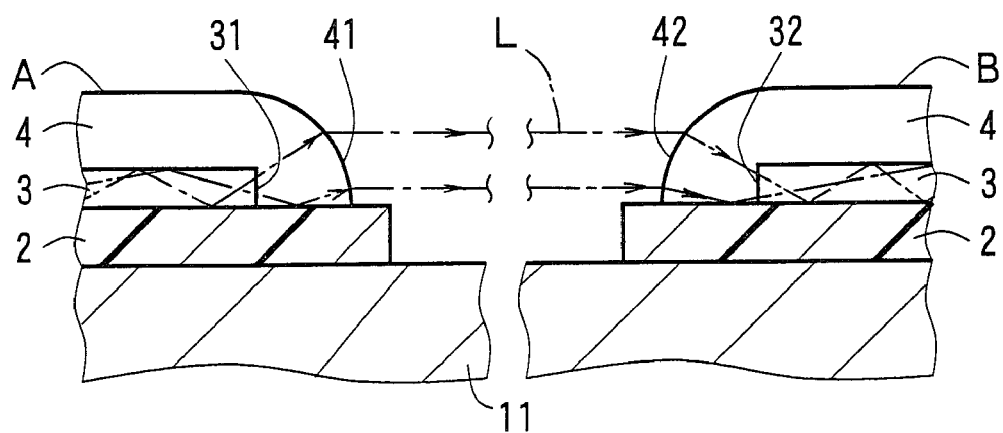

In this embodiment, more specifically, the pattern of the cores 3 is configured, as shown in FIG. 1(a), such that the light emitting cores 3 extend from one end of the L-shaped optical waveguide portion A to inner edges of the L-shaped optical waveguide portion A (on the side of the display screen of the display 11 in FIG. 2) in equidistantly juxtaposed relation and the light incident cores 3 extend from one end of the L-shaped optical waveguide portion B to inner edges of the L-shaped optical waveguide portion B (on the side of the display screen of the display 11 in FIG. 2) in equidistantly juxtaposed relation. As shown in FIGS. 3(*a*) and 3(*b*), end faces of the light emitting cores 3 facing inward of the L-shaped optical waveguide portion A are each bulged in a generally arcuate shape as seen in plan, each serving as a convex first lens portion 31. Similarly, end faces of the light incident cores 3 facing inward of the L-shaped optical waveguide portion B are each bulged in a generally arcuate shape as seen in plan, each serving as a convex fourth lens portion 32. The shapes of the first lens portion 31 and the fourth lens portion 32 are not limited to the convex lens shape, but examples thereof include a Fresnel lens shape and a grating lens shape, among which the Fresnel lens shape is preferred for space saving.

Edge portions of the over-cladding layer 4 covering the first lens portions 31 of the light emitting cores 3 and the fourth lens portions 32 of the light incident cores 3 are each curved in a generally quarter arcuate shape as laterally seen. Thus, the edge portion of the over-cladding layer 4 covering the first lens portions 31 of the light emitting cores 3 serves as a generally convex second lens portion 41, and the edge portion of the over-cladding layer 4 covering the fourth lens portions 32 of the light incident cores 3 serves as a generally convex third lens portion 42. The shapes of the second lens portion 41 and the third lens portion 42 of the over-cladding layer 4 are not limited to the generally convex shape, but may be other shape.

With the two L-shaped optical waveguide portions A, B being disposed along the periphery of the display screen of the display 11 of the touch panel 10 as shown in FIG. 2, ends of the light emitting cores disposed at one end a of the L-shaped light emitting optical waveguide portion A (on a lower right side in FIG. 2) are connected to a light source (not shown), and ends of the light incident cores disposed at one end b of the L-shaped light incident optical waveguide portion B (on the lower right side in FIG. 2) are connected to a detector (not shown).

As shown in FIGS. 3(*a*) and 3(*b*), lateral divergence (along the under-cladding layer 2) of the light beams L emitted from the ends of the light emitting cores 3 in the L-shaped light emitting optical waveguide portion A is first suppressed by the refractive action of the first lens portions 31 at the ends of the light emitting cores 3. Then, vertical divergence of the light beams L (along the plane perpendicular to the under-cladding layer 2) is suppressed by the refractive action of the second lens portion 41 in the edge portion of the over-cladding layer 4. The light beams L travel along the display screen of the display 11. That is, the light beams L traveling along the display screen of the display 11 are collimated with their divergence suppressed by the refractive actions of the two types of lens portions (the first lens portions 31 and the second lens portion 41).

Then, the collimated light beams to be incident on the edge portion of the over-cladding layer 4 in the L-shaped light incident optical waveguide portion B are converged vertically (along the plane perpendicular to the under-cladding layer 2) by the refractive action of the third lens portion 42 in the edge portion of the over-cladding layer 4. Subsequently, the light beams L are further converged laterally (along the under-cladding layer 2) by the refractive action of the fourth lens portions 32 at the ends of the light incident cores 3. That is, the light beams L incident on the L-shaped light incident optical waveguide portion B are converged by the refractive actions of the two types of the lens portions (the third lens portion 42 and the fourth lens portions 32), and the converged light beams L respectively pass through the light incident cores 3.

As shown in FIG. 2, the two L-shaped optical waveguide portions A, B cause the collimated light beams L to travel in a lattice form on the display screen of the display 11 of the touch panel 10. When a portion of the display screen of the display 11 is touched by a finger in this state, the position of the portion touched by the finger is accurately detected. In addition, the light beams L to be incident on the light incident cores 3 in the L-shaped optical waveguide portion B are provided by converging the light beams L emitted from the L-shaped optical waveguide portion A. Therefore, the touch panel optical waveguide has a higher light transmission efficiency, so that detection accuracy is improved. In FIG. 2, the light beams L are partly shown.

The sizes of the optical waveguide portions A, B are not particularly limited, but may be determined so as to conform to the size of the display 11 of the touch panel 10. For example, the optical waveguide portions each have a length and a width of about 30 to about 300 mm, and a linear portion width of about 50 µm to about 2 mm. Further, the number of the light emitting cores 3 (the light incident cores 3) is not particularly limited, but may be determined according to the number of operation items to be displayed on the display screen of the display 11, for example, about 20 to about 100.

Next, an exemplary production method for the touch panel optical waveguide according to the first inventive aspect will be described.

Figure 4:
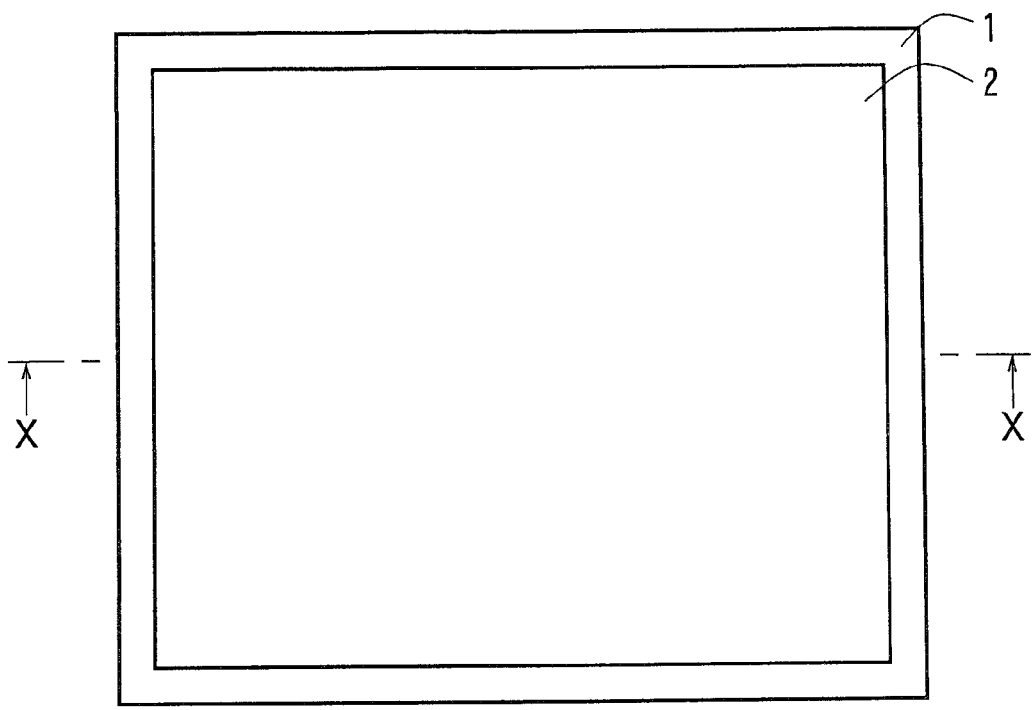
FIGS. 4(a) and 4(b) are a plan view and an X-X sectional view schematically showing a production method for the touch panel optical waveguide.
Figure 4:

As shown in FIGS. 4(*a*) and 4(*b*), a planar base 1 for the production of the touch panel optical waveguide (see FIGS. 1(*a*) and 1(*b*)) is first prepared. A material for the formation of the base 1 is not particularly limited, but examples thereof include resins, glass, silicone and metals. Examples of the resins include polypropylenes, polyethylenes, polyethylene naphthalates, polyesters, polyacrylates, polycarbonates, polynorbornenes and polyimides. Particularly, the base 1 preferably has a lower refractive index for suppressing leak of light to the base 1, and preferred examples of the material include polypropylenes, glass and silicone. The thickness of the base 1 is not particularly limited, but is typically in the range of 20 µm (for a film-like base 1) to 5 mm (for a plate-like base 1).

In turn, an under-cladding layer 2 is formed on a predetermined region of a surface of the base 1. Examples of a material for the formation of the under-cladding layer 2 include polyimide resins, epoxy resins, photopolymerizable resins and photosensitive resins. The method for the formation of the under-cladding layer 2 is not particularly limited, but the formation may be achieved, for example, by applying a varnish prepared by dissolving any of the aforementioned resins in a solvent onto the base 1, and then curing the varnish. The application of the varnish is achieved, for example, by a spin coating method, a dipping method, a casting method, an injection method, an ink jet method or the like. The curing is carried out as appropriate depending on the material for the formation of the under-cladding layer 2, the thickness of the under-cladding layer 2 and the like. Where a polyimide resin is employed as the material for the formation of the under-cladding layer 2, for example, the curing is achieved by a heat treatment at 300° C. to 400° C. for 60 to 180 minutes. Where a photopolymerizable resin is employed as the material for the formation of the under-cladding layer 2, the curing is achieved by irradiation, for example, with ultraviolet radiation at 1000 to 5000 mJ/cm$^2$ followed by a heat treatment at 80° C. to 120° C. for 10 to 30 minutes. The thickness of the under-cladding layer 2 is typically 5 to 50 μm for a multimode optical waveguide, and 1 to 20 μm for a single-mode optical waveguide.

Figure 5:
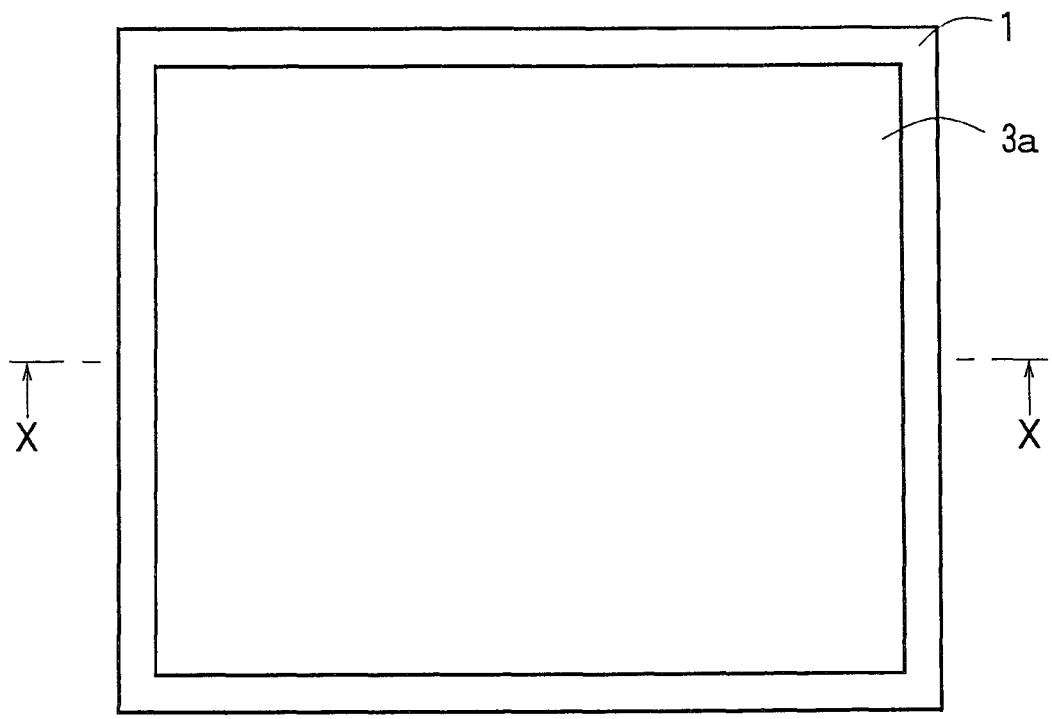
FIGS. 5(a) and 5(b) are a plan view and an X-X sectional view schematically showing the production method for the touch panel optical waveguide.
Figure 5:
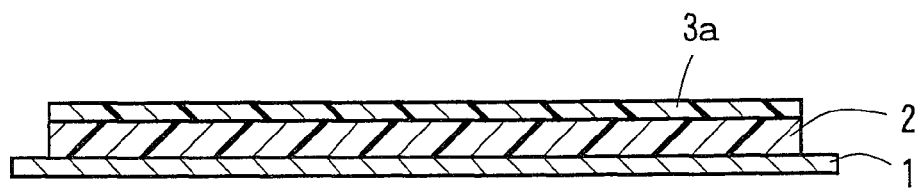

Next, as shown in FIGS. 5(a) and 5(b), a resin layer 3a later serving as cores 3 (see FIGS. 6(a) and 6(b)) is formed on a surface of the under-cladding layer 2. An exemplary material for the formation of the resin layer 3a is a photopolymerizable resin, which is a material having a greater refractive index than the materials for the formation of the aforementioned under-cladding layer 2 and an over-cladding layer 4 to be described later (see FIG. 9). The refractive index may be adjusted, for example, by selection of the types of the materials for the formation of the under-cladding layer 2, the cores 3 and the over-cladding layer 4 and adjustment of the composition ratio thereof. The method for the formation of the resin layer 3a is not particularly limited, but the formation may be achieved in the same manner as described above, for example, by applying a varnish prepared by dissolving the photopolymerizable resin in a solvent onto the under-cladding layer 2, and then drying the varnish. The application of the varnish is achieved in the same manner as described above, for example, by a spin coating method, a dipping method, a casting method, an injection method, an ink jet method or the like. The drying is achieved by a heat treatment at 50° C. to 120° C. for 10 to 30 minutes.

Figure 6:
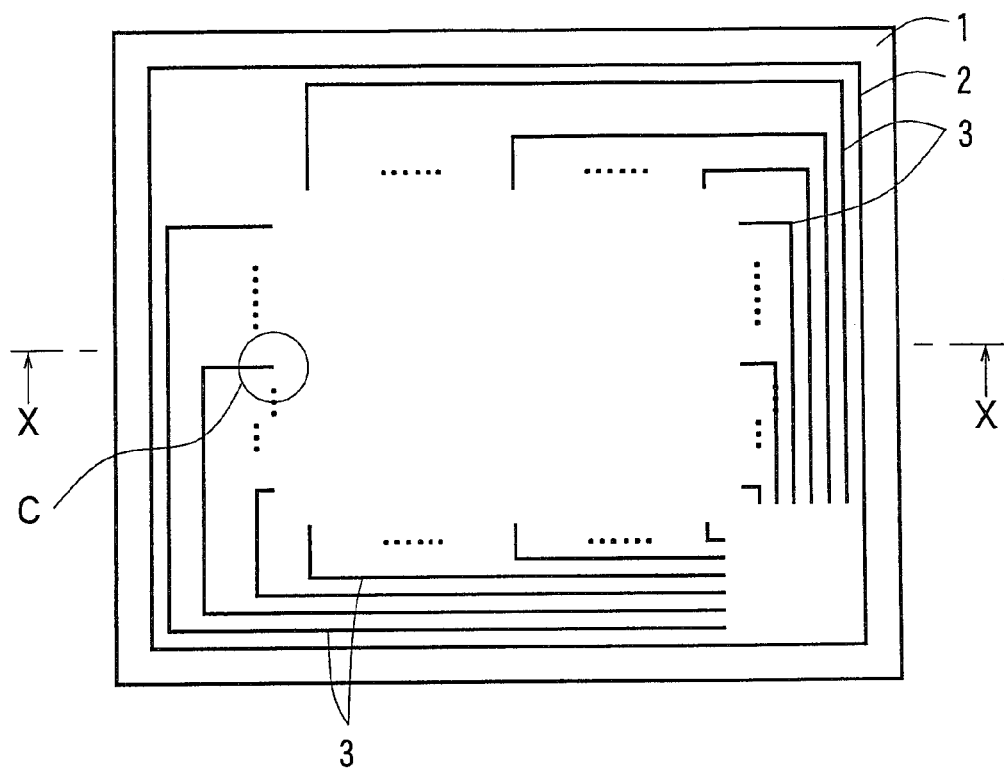
FIGS. 6(a), 6(b) and 6(c) are a plan view, an X-X sectional view and an enlarged view of an end of a core in a circled area C in FIG. 6(a), schematically showing the production method for the touch panel optical waveguide.
Figure 6:
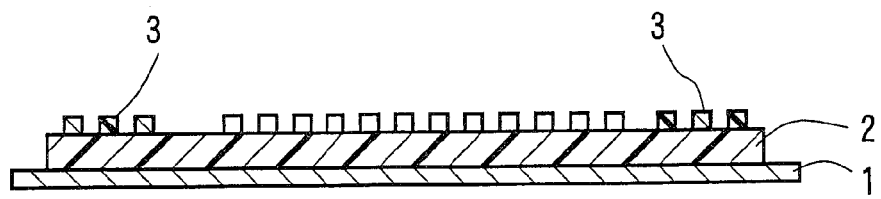
Figure 6:
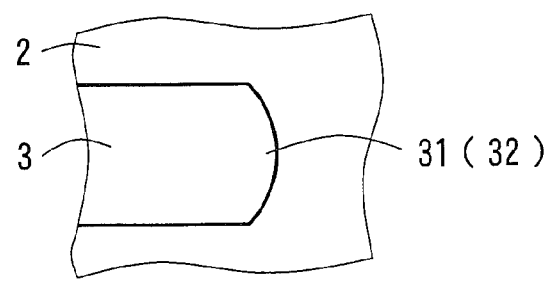

Then, the resin layer 3a is exposed to radiation through a photo mask formed with an opening pattern corresponding to a desired pattern of the cores 3 (see FIGS. 6(a) to 6(c)). Exposed portions of the resin layer later serve as the cores 3. In this embodiment, the pattern of the cores 3 is configured such that the cores are formed in portions of the resin layer corresponding to two L-shaped optical waveguide portions A, B (see FIG. 1(a)) and opposed ends of light emitting cores 3 and light incident cores 3 each have a convex lens portion (a first lens portion 31 or a fourth lens portion 32) as seen in plan in FIG. 6(c). Further, equal numbers of end faces of the light emitting cores and the light incident cores are opposed with the optical axes of the light emitting cores being respectively aligned with the optical axes of the light incident cores. Exemplary methods for the exposure include projection exposure, proximity exposure and contact exposure. Where the resin layer 3a is non-adhesive, a contact exposure method is preferably employed in which the photo mask is brought into contact with the resin layer 3a. This improves the operating efficiency and permits reliable patterning of a latent image. Examples of the radiation for the exposure include visible light, ultraviolet radiation, infrared radiation, X-rays, α-rays, β-rays and γ-rays. Preferably, the ultraviolet radiation is used. The use of the ultraviolet radiation permits irradiation at a higher energy to provide a higher curing speed. In addition, a less expensive smaller-size irradiation apparatus can be employed, thereby reducing production costs. Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 to 10000 mJ/cm$^2$, preferably 50 to 3000 mJ/cm$^2$.

After the exposure, a heat treatment is performed to complete a photoreaction. The heat treatment is performed at 80° C. to 250° C., preferably at 100° C. to 200° C., for 10 seconds to two hours, preferably for five minutes to one hour. Thereafter, a development process is performed by using a developing solution to dissolve away an unexposed portion of the resin layer 3a, whereby the resin layer 3a is patterned (see FIGS. 6(a) to 6(c)). Then, the developing solution in the patterned resin layer 3a is removed by a heat treatment, whereby the pattern of the cores 3 is formed as shown in FIGS. 6(a) to 6(c). This heat treatment is typically performed at 80° C. to 120° C. for 10 to 30 minutes. The cores 3 typically each have a thickness of 20 to 100 μm for the multimode optical waveguide, and 2 to 10 μm for the single-mode optical waveguide. Exemplary methods to be employed for the development include an immersion method, a spray method and a puddle method. Examples of the developing solution to be used include an organic solvent and an organic solvent containing an alkaline aqueous solution. The developing solution and conditions for the development are properly selected depending on the composition of the photopolymerizable resin.

Figure 7:
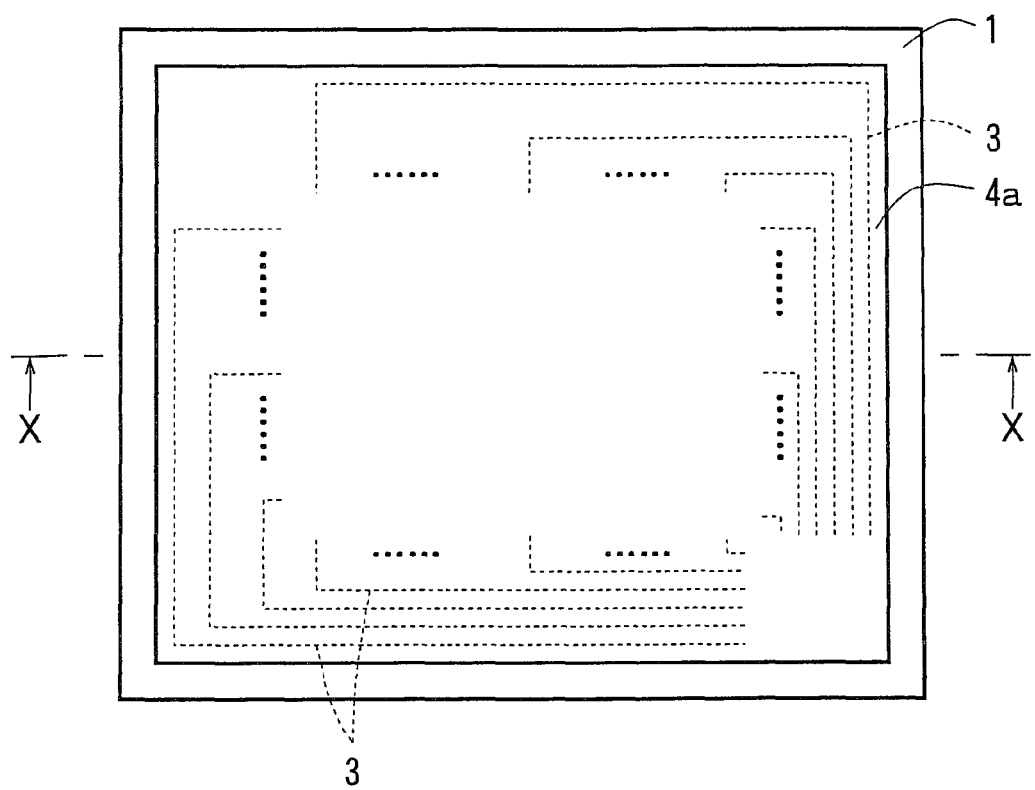
FIGS. 7(a) and 7(b) are a plan view and an X-X sectional view schematically showing the production method for the touch panel optical waveguide.
Figure 7:
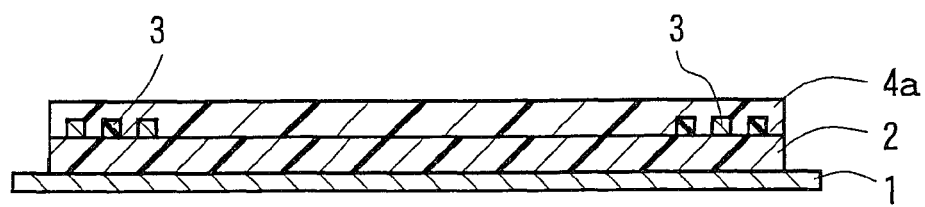
Figure 8:
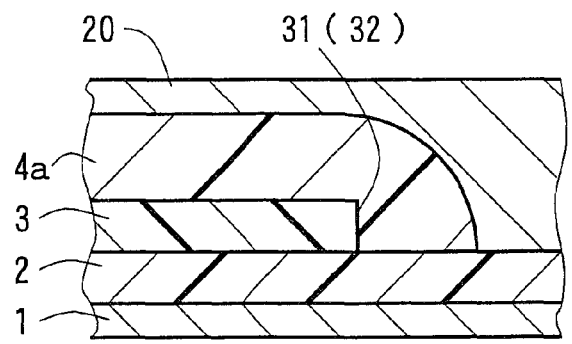
FIG. 8 is a sectional view schematically showing a method of producing an edge portion of an over-cladding layer of the touch panel optical waveguide.
Figure 9:
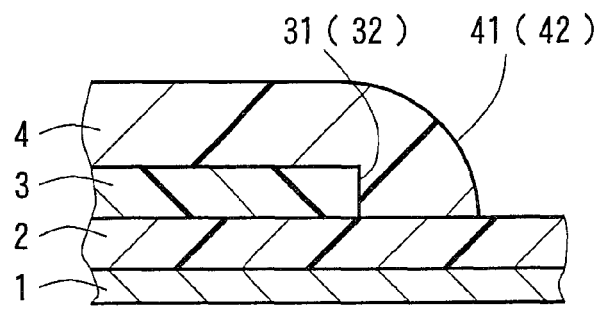
FIG. 9 is a sectional view schematically illustrating the core and the edge portion of the over-cladding layer of the touch panel optical waveguide.

Next, as shown in FIGS. 7(a) and 7(b), a vanish prepared from the same material as the vanish for the under-cladding layer 2 is applied over the cores in the same manner as described above for formation of an over-cladding layer 4 (see FIG. 9). Portions of the resulting layer 4a corresponding to the two L-shaped optical waveguide portions A, B (see FIG. 1(a)) are pressed by a mold 20 (see FIG. 8) having a shape conformable to a desired shape of the over-cladding layer 4. Particularly, edge portions of the layer 4a covering the end faces (first lens portions 31) of the light emitting cores 3 and the end faces (fourth lens portions 32) of the light incident cores 3 are each formed into a generally convex lens shape as laterally seen by the mold 20.

Next, the layer 4a is cured in the same manner as for the formation of the under-cladding layer 2. Where a polyimide resin is employed as the material for the formation of the over-cladding layer 4, for example, a heat treatment is performed. Where a photopolymerizable resin is employed, the curing is achieved by irradiation with ultraviolet radiation through the mold 20 followed by a heat treatment. Thus, the method for curing the layer 4a varies depending on the material for the formation of the over-cladding layer 4. Where the curing is achieved by the irradiation with the ultraviolet radiation, a quartz mold, for example, is employed as the mold 20 for transmission of the ultraviolet radiation. Where the curing is achieved by the heat treatment, a quartz mold, a polymer mold or a metal mold may be employed.

Thereafter, the resulting product is demolded. Thus, the over-cladding layer 4 is formed. Particularly, as shown in FIG. 9, a lens portion (second lens portion 41) is provided in a light emitting edge portion and a lens portion (third lens portion 42) is provided in a light incident edge portion. Exemplary materials for the formation of the over-cladding layer 4 are those employed for the formation of the under-cladding layer 2. The material for the formation of the over-cladding layer 4 may be the same as or different from the material for the formation of the under-cladding layer 2. The thickness of the over-cladding layer 4 is typically 5 to 100 μm for the multimode optical waveguide, and 1 to 20 μm for the single-mode optical waveguide.

Subsequently, the base 1 is removed from the under-cladding layer 2. The base 1 and the under-cladding layer 2 are bonded to each other with a smaller adhesive force because of their formation materials and, therefore, can be readily pulled apart from each other by air suction. Thereafter, the resulting product is cut into the two L-shaped optical waveguide portions A, B by stamping with a cutting die. Thus, the touch panel optical waveguide including the two L-shaped optical waveguide portions A, B shown in FIGS. 1(a) and 1(b) is provided.

Where a film base is employed as the base 1, the base 1 may be removed from the under-cladding layer 2 after the resulting product including the film base 1 is cut into the L-shaped planer portions. Alternatively, the touch panel optical waveguide may be used together with the base 1 without removal of the base 1.

In order to suppress leak of the light beams to the under-cladding layer 2 or the base 1, (refractive index of cores 3)>(refractive index of over-cladding layer 4)>(refractive index of under-cladding layer 2 or base 1) is preferably satisfied.

Figure 10:
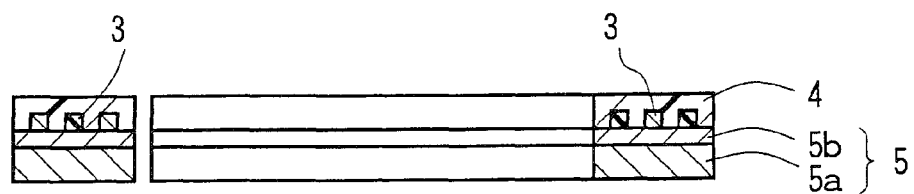
FIG. 10 is a sectional view schematically illustrating a touch panel optical waveguide according to another embodiment of the first inventive aspect.

FIG. 10 illustrates a touch panel optical waveguide according to another embodiment of the first inventive aspect. The touch panel optical waveguide according to this embodiment is configured in substantially the same manner as the touch panel optical waveguide according to the aforementioned embodiment, except that bases 5 each including an L-shaped planar base plate 5a and a thin metal film 5b provided on a surface of the base plate 5a is employed instead of the under-cladding layer 2 as shown in FIG. 1(b), that the cores 3 and the over-cladding layer 4 are provided on the surface of the thin metal film 5b, and that the surface of the thin metal film 5b acts as a reflective surface which reflects the light beams passing through the cores 3. Like components will be denoted by like reference characters.

More specifically, the base plate 5a is not particularly limited, but examples thereof include a resin substrate, a glass substrate, and a silicone substrate. Exemplary materials for formation of the resin substrate include polyethylene naphthalates, polyesters, polyacrylates, polycarbonates, polynorbornenes and polyimides. The thickness of the base plate 5a is not particularly limited, but is typically in the range of 2 mm to 5 mm.

Formation of the thin metal film 5b is achieved by plating or evaporation. Exemplary materials for the formation of the thin metal film 5b include nickel, copper silver, gold, chromium, aluminum, zinc, tin, cobalt, tungsten, platinum and palladium, and alloy materials containing two or more of these elements. The thickness of the thin metal film is not particularly limited, but is typically 50 nm to 5 μm.

In a production method for the touch panel optical waveguide according to this embodiment, L-shaped planar base plates 5a are prepared, and a thin metal film 5b is formed on a surface of each of the base plates 5a by plating or evaporation. Then, cores 3 and an over-cladding layer 4 are formed on a surface of the thin metal film 5b in the same manner as in the embodiment described above. Thus, the touch panel optical waveguide is provided.

In the embodiments described above, the touch panel optical waveguides each include the two L-shaped optical waveguide portions A, B, but the configuration of the inventive touch panel optical waveguide is not limited to the aforementioned configuration. The inventive touch panel optical waveguide may include a unitary rectangular planar frame including four I-shaped optical waveguide portions. The frame may be polygonal (e.g., hexagonal) or circular.

Figure 11:
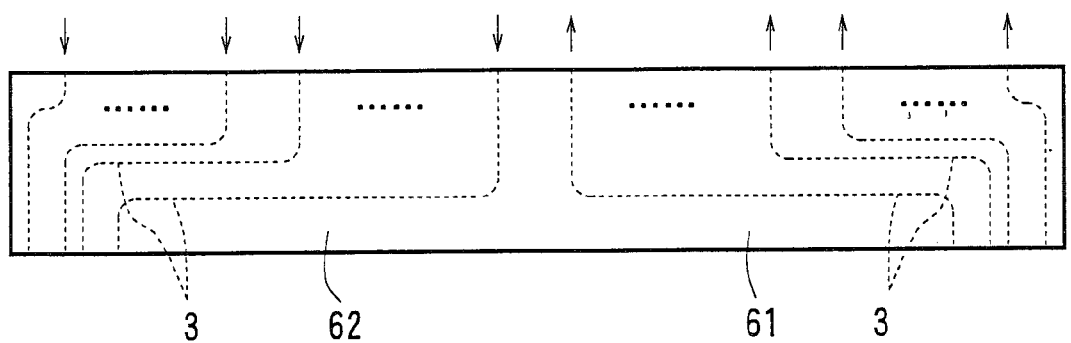
FIG. 11 is a sectional view schematically illustrating a touch panel optical waveguide according to one embodiment of a second inventive aspect.
Figure 12:
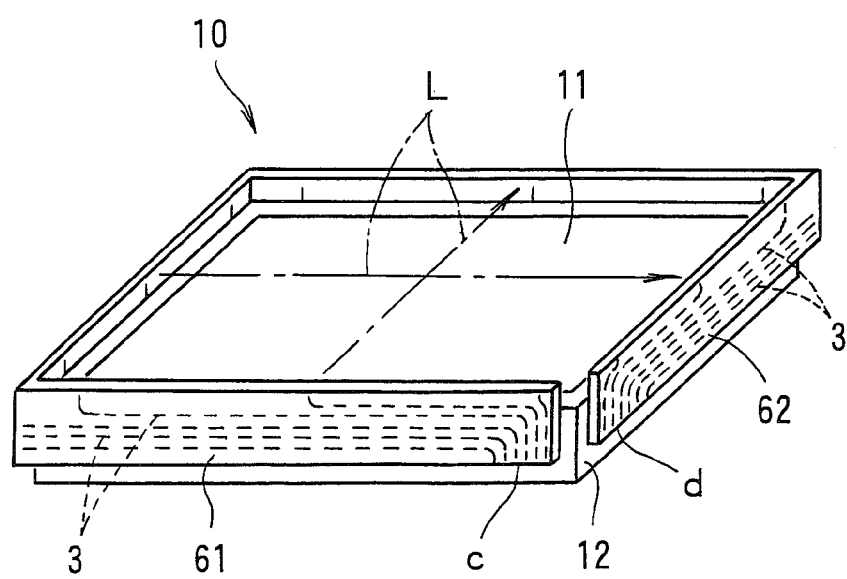
FIG. 12 is a perspective view schematically illustrating a touch panel employing the touch panel optical waveguide.

FIG. 11 illustrates an optical waveguide for a touch panel according to an embodiment of the second inventive aspect. The touch panel optical waveguide according to this embodiment has a band shape, and is configured such that a plurality of cores 3 are enclosed by an under-cladding layer 2 and an over-cladding layer 4 as shown in FIGS. 1(a) and 1(b). Further, a thin metal film (a first reflective layer 61 and a second reflective layer 62) is provided on a surface of the over-cladding layer 4. The under-cladding layer 2 is light-transmissive. As shown in FIG. 12, the band-shaped optical waveguide is wrapped around a rectangular tubular optical waveguide fixture frame 12 with the thin metal film (the first reflective layer 61 and the second reflective layer 62) facing outward, and the optical waveguide fixture frame 12 is fitted around a periphery of a rectangular display 11 of the touch panel 10. Thus, the optical waveguide is set along the periphery of the display 11. In this setting state, a longitudinally extending upper edge portion of the band-shaped optical waveguide slightly projects from an opening defined by an upper edge of the optical waveguide fixture frame 12, and slightly projects upward from a display screen of the display 11 of the touch panel 10. A projecting portion of the optical waveguide serves for emission and reception of light beams L. The other features of this embodiment are the same as those of the aforementioned embodiments, and like components will be denoted by like reference characters.

In this embodiment, more specifically, a pattern of the cores 3 of the band-shaped optical waveguide is configured, as shown in FIG. 11, such that a plurality of light incident cores 3 are equidistantly arranged as extending perpendicularly from a left end portion of a lower side face to an upper edge portion of the band-shaped optical waveguide in a longitudinally half region (a left half region) of the band-shaped optical waveguide. Further, a plurality of light emitting cores 3 are arranged symmetrically with the cores provided in the left half region. That is, the light emitting cores 3 are equidistantly arranged as extending perpendicularly from a right end portion of the lower side face to the upper edge portion of the optical waveguide in the other longitudinally half region (a right half region). In FIG. 11, the right half region and the left half region of the band-shaped optical waveguide are respectively illustrated as serving as a light emitting portion which emits light beams (indicated by arrows) and a light incident portion on which the light beams are incident.

The light emitting cores 3 each have a first lens portion 31 provided at an end thereof located in the upper edge portion of the band-shaped optical waveguide in the right half region for suppressing lateral divergence of the emitted light beam (along the under-cladding layer 2 (see FIG. 13)). An edge portion of the over-cladding layer 4 covering the first lens portions of the light emitting cores 3 has substantially the same shape as the second lens portion 41 as shown in FIGS. 3(a) and 3(b), and the thin metal film (the first reflective film 61) is provided on a surface of the edge portion. The light incident cores 3 each have a fourth lens portion 32 provided at an end thereof located in the upper edge portion of the band-shaped optical waveguide in the left half region for laterally converging the incident light beam (along the under-cladding layer 2 (see FIG. 13)). An edge portion of the over-cladding layer 4 covering the fourth lens portions 32 of the light incident cores 3 has substantially the same shape as the third lens portion 42 as shown in FIGS. 3(a) and 3(b), and the thin metal film (the second reflective film 62) is provided on a surface of the edge portion.

Figure 13:
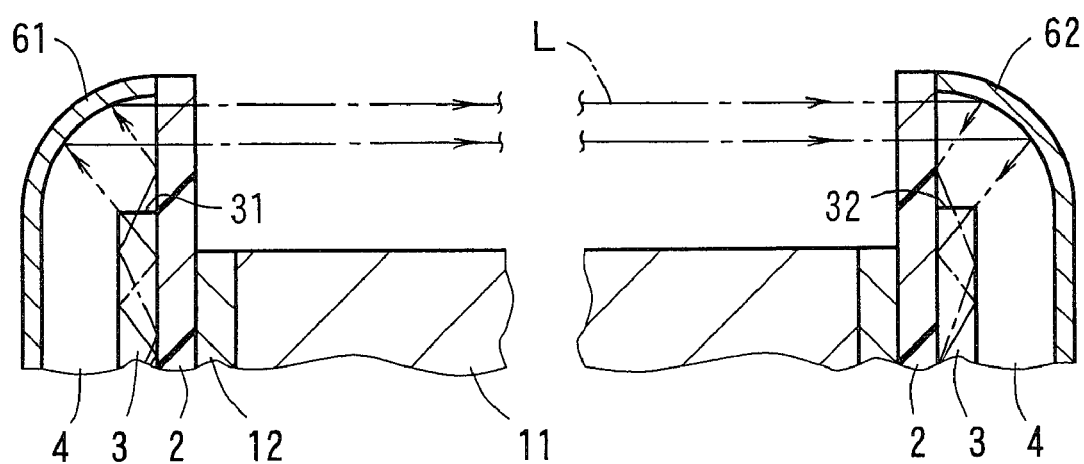
FIG. 13 is an explanatory diagram schematically showing light transmission in the touch panel optical waveguide as seen parallel to an under-cladding layer and perpendicularly to a light transmission direction.

With the band-shaped optical waveguide being disposed along the periphery of the display 11, as shown in FIGS. 12 and 13, the edge portions of the over-cladding layer 4 corresponding to the second lens portion 41 and the third lens portion 42 project from the upper opening of the optical waveguide fixture frame 12, and project upward from the display screen of the display 11 of the touch panel 10. A light source (not shown) is connected to the light emitting cores at one end c of the band-shaped optical waveguide (on a lower right side in FIG. 12), and a detector (not shown) is connected to the light incident cores at the other end d of the optical waveguide (on the lower right side in FIG. 12).

As shown in FIG. 13, the lateral divergence (along the under-cladding layer 2) of the light beams L emitted from the ends of the light emitting cores 3 is suppressed by the refractive action of the first lens portions 31 at the ends of the light emitting cores 3. Then, vertical divergence of the light beams L (along a plane perpendicular to the under-cladding layer 2) is suppressed by the reflective action of the first reflective layer 61 provided on the surface of the edge portion of the over-cladding layer 4. The light beams L pass through the under-cladding layer 2, and travel along the display screen of the display 11. That is, the light beams L traveling on the display screen of the display 11 are collimated with their divergence suppressed by the refractive action of the first lens portions 31 and the reflective action of the first reflective layer 61.

On the light incident side, the collimated light beams pass through the under-cladding layer 2 to be incident on the edge portion of the over-cladding layer 4, and are converged vertically (along a plane perpendicular to the under-cladding layer 2) by the reflective action of the second reflective layer 62 provided on the surface of the edge portion of the over-cladding layer 4. Then, the light beams L are further converged laterally (along the under-cladding layer 2) by the refractive action of the fourth lens portions 32 provided at the ends of the light incident cores 3. That is, the incident light beams L on the light incident side are converged by the reflective action of the second reflective layer 62 and the refractive action of the fourth lens portions 32, and the converged light beams L travel through the light incident cores 3.

The thin metal film (the first reflective layer 61 and the second reflective layer 62) is simply required to be provided at least on the surfaces of the edge portions of the over-cladding layer 4 which are contributable to reflection of the light beams L. Formation of the thin metal film (the first reflective layer 61 and the second reflective layer 62) is achieved in the same manner as the aforementioned thin metal film 5b (see FIG. 10). The thickness of the thin metal film is not particularly limited, but typically in the range of 30 to 300 nm, preferably in the range of 50 to 150 nm.

In FIG. 13, the base 1 is removed for use. Where the touch panel optical waveguide is used together with the base 1 without removal of the base 1, the base 1 should be light-transmissive.

In this embodiment, the touch panel optical waveguide has a unitary band shape, but the shape of the touch panel optical waveguide is not limited to the unitary band shape. The light incident portion and the light emitting portion may be provided as separate members.

Next, an example of the invention will be described. It should be noted that the present invention is not limited to the inventive example.

EXAMPLE 1

Material for Formation of Under-Cladding Layer and Over-Cladding Layer

A material for formation of an under-cladding layer and an over-cladding layer was prepared by mixing 35 parts by weight of bisphenoxyethanolfluorene glycidyl ether (component A) represented by the following general formula (1), 40 parts by weight of (3'-4'-Epoxycyclohexane)methyl 3'-4'-Epoxycyclohexyl-carboxylate (an alicyclic epoxy CELLOXIDE 2021P manufactured by Daicel Chemical Industries, Ltd.) (component B), 25 parts by weight of an alicyclic epoxy resin having a cyclohexene oxide skeleton (CELLOXIDE 2081 manufactured by Daicel Chemical Industries, Ltd.) (component C), and 2 parts by weight of a 50% propione carbonate solution of 4,4'-bis[di(β-hydroxyethoxy)phenylsulfinio]phenylsulfide bishexafluoroantimonate (component D).

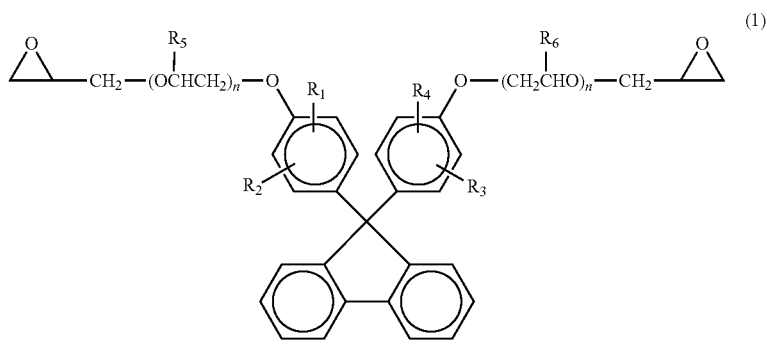

wherein R1 to R6 are hydrogen atoms, and n=1.

Material for Formation of Cores

A material for formation of cores was prepared by dissolving 70 parts by weight of the aforementioned component A, 30 parts by weight of 1,3,3-tris{4-[2-(3-oxetanyl)]butoxyphenyl}butane and one part by weight of the aforementioned component D in ethyl lactate.

Production of Touch Panel Optical Waveguide

The material for the formation of the under-cladding layer was applied onto a surface of a polyethylene terephthalate (PET) film (100 mm×100 mm×188 μm (thickness)) by an applicator, and then exposed to ultraviolet radiation at 2000 mJ/cm$^2$. Subsequently, a heat treatment was performed at 100° C. for 15 minutes to form an under-cladding layer. The under-cladding layer had a thickness of 20 μm as measured by a contact film thickness meter. Further, the under-cladding layer had a refractive index of 1.542 at a wavelength of 830 nm.

Then, the material for the formation of the cores was applied onto a surface of the under-cladding layer by an applicator, and dried at 100° C. for 5 minutes. In turn, a synthetic quartz chromatic mask (photo mask) having an opening pattern conformable to a core pattern to be formed was placed on the resulting core material film, and the core material film was exposed to ultraviolet radiation emitted from above at 4000 mJ/cm$^2$ by a proximity exposure method. Further, a heat treatment was performed at 80° C. for 15 minutes. Subsequently, a development process was performed by using a γ-butyrolactone aqueous solution to dissolve away unexposed portions, and then a heat treatment was performed at 120° C. for 15 minutes, whereby light emitting cores and light incident cores were formed as each having a convex lens portion as seen in plan at an light emitting or light incident end thereof. The number of cores formed on each edge of the L-shaped optical waveguide portions was 50. The cores each had a sectional area of 12 μm (width)×24 μm (height) as measured by SEM. The cores each had a refractive index of 1.602 at a wavelength of 830 nm.

Then, the material for the formation of the over-cladding layer was applied by an applicator to cover the cores, then pressed by a quartz mold, and exposed to ultraviolet radiation through the mold at 2000 mJ/cm². In turn, a heat treatment was performed at 120° C. for 15 minutes, and then the resulting product was demolded. Thus, the over-cladding layer was formed as having a generally convex lens portion as seen laterally in a light emitting edge portion and a light incident edge portion thereof. The over-cladding layer had a thickness of 1000 μm as measured by the contact film thickness meter. Further, the over-cladding layer had a refractive index of 1.542 at a wavelength of 830 nm.

Thereafter, the resulting product was cut together with the PET film into two L-shaped planar portions by a cutting die. Thus, two L-shaped optical waveguide portions (each having a size of 66.3 mm×70.0 mm and a linear portion width of 1 mm) fixed to the PET film was provided.

The two L-shaped optical waveguide portions thus provided were placed in opposed relation on a surface of a rectangular planar frame-shaped glass epoxy board, and positioned relative to each other with the optical axes of the cores of one of the optical waveguide portions aligning with the optical axes of the cores of the other optical waveguide portion by means of a microscope. Thereafter, the optical waveguide portions were fixed to the board with a UV-curable adhesive. At this time, a mating surface was the PET film. Then, a light emitting element (VCSEL) was connected to one end of the L-shaped light emitting optical waveguide portion, and a light receiving element (ASIC) was connected to one end of the L-shaped light incident optical waveguide portion. When light (having a wavelength of 850 nm) was emitted from the light emitting element at an intensity of 5 mW, the light was detected at an intensity of 0.5 mW by the light receiving element.

Thus, it is confirmed that the light can be detected at a higher light transmission efficiency even if the two L-shaped optical waveguide portions of the touch panel optical waveguide are installed in an ordinary manner (with the axes of the cores of the one optical waveguide portion aligning with the optical axes of the cores of the other optical waveguide portion) without the positioning of the lens portions between the L-shaped optical waveguide portions.

What is claimed is:

1. A touch panel optical waveguide to be disposed along a periphery of a display screen of a display of a touch panel, the touch panel optical waveguide comprising:
   a planar base;
   cores of uniform thickness provided on a surface of the base; and
   an over-cladding layer covering the cores;
   the cores including a light emitting core of uniform thickness having an end positioned on one side of the display screen of the display for emitting a light beam, and a light incident core of uniform thickness having an end positioned on the other side of the display screen of the display for receiving a light beam incident thereon;
   wherein the light emitting core has a first lens portion provided at the end thereof for suppressing lateral divergence of the emitted light beam;
   wherein the over-cladding layer has a second lens portion provided in an edge portion thereof covering the end of the light emitting core for suppressing vertical divergence of the emitted light beam transmitted through the first lens portion;
   wherein the over-cladding layer has a third lens portion provided in an edge portion thereof covering the end of the light incident core for vertically converging the incident light beam;
   wherein the light incident core has a fourth lens portion provided at the end thereof for further laterally converging the incident light beam transmitted through the third lens portion.

2. The touch panel optical waveguide as set forth in claim 1, wherein the planar base is a base plate formed with a thin metal film or an under-cladding layer.

3. A band-shaped touch panel optical waveguide to be disposed along a periphery of a display of a touch panel, the touch panel optical waveguide comprising:
   a light-transmissive under-cladding layer;
   cores of uniform thickness provided on a surface of the under-cladding layer; and
   an over-cladding layer covering the cores;
   the cores including a light emitting core of uniform thickness having an end positioned on one side of the display for emitting a light beam, and a light incident core of uniform thickness having an end positioned on the other side of the display for receiving a light beam incident thereon;
   wherein the light emitting core has a lens portion A provided at the end thereof for suppressing lateral divergence of the emitted light beam;
   wherein a first reflective layer which suppresses vertical divergence of the emitted light beam transmitted through the lens portion A is provided on a surface of an edge portion of the over-cladding layer covering the end of the light emitting core;
   wherein a second reflective layer which vertically converges the incident light beam is provided on a surface of an edge portion of the over-cladding layer covering the end of the light incident core;
   wherein the light incident core has a lens portion B provided at the end thereof for further laterally converging the incident light beam reflected at the second reflective layer.

* * * * *